US012640492B2

(12) United States Patent
Okita

(10) Patent No.: US 12,640,492 B2
(45) Date of Patent: May 26, 2026

(54) REFLECT ARRAY

(71) Applicant: Japan Display Inc., Tokyo (JP)

(72) Inventor: Mitsutaka Okita, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 254 days.

(21) Appl. No.: 18/623,165

(22) Filed: Apr. 1, 2024

(65) Prior Publication Data

US 2024/0243484 A1    Jul. 18, 2024

Related U.S. Application Data

(63) Continuation of application No. PCT/JP2022/033715, filed on Sep. 8, 2022.

(30) Foreign Application Priority Data

Oct. 7, 2021    (JP) ................................ 2021-165730

(51) Int. Cl.
H01Q 15/14 (2006.01)
G02F 1/1333 (2006.01)
G02F 1/1343 (2006.01)

(52) U.S. Cl.
CPC ..... H01Q 15/148 (2013.01); G02F 1/133302 (2021.01); G02F 1/134336 (2013.01)

(58) Field of Classification Search
CPC ........ G02F 1/133302; G02F 1/134336; H01Q 15/14; H01Q 15/148; H01Q 3/44
See application file for complete search history.

(56) References Cited

U.S. PATENT DOCUMENTS 6,456,419 B1 *    9/2002    Winker .............. G02B 27/0087
349/193

FOREIGN PATENT DOCUMENTS

JP          H11-103201 A        4/1999

* cited by examiner

*Primary Examiner* — Timothy A Brainard
(74) *Attorney, Agent, or Firm* — XSENSUS LLP

(57) ABSTRACT

A reflect array includes a patch electrode, a ground electrode arranged opposite the patch electrode and spaced apart from the patch electrode, a liquid crystal layer between the patch electrode and the ground electrode, and a dielectric substrate on an opposite side of the patch electrode from the liquid crystal layer. A thickness T from a surface on the liquid crystal layer side of the patch electrode to a surface on the opposite side of the dielectric substrate from the patch electrode has a thickness equivalent to a quarter of the wavelength of the radio wave irradiated to the patch electrode.

11 Claims, 11 Drawing Sheets

REFLECT ARRAY

CROSS-REFERENCE TO RELATED APPLICATIONS

This application is a Continuation of International Patent Application No. PCT/JP2022/033715, filed on Sep. 8, 2022, which claims the benefit of priority to Japanese Patent Application No. 2021-165730, filed on Oct. 7, 2021, the entire contents of which are incorporated herein by reference.

FIELD

An embodiment of the present invention relates to a reflect array capable of controlling the traveling direction of reflected radio waves.

BACKGROUND

A phased array antenna device controls directivity while the antenna is fixed by adjusting the amplitude and phase of a high-frequency signal to be applied to each of a plurality of antenna elements arranged in a plane shape. The phased array antenna device requires a phase shifter. A phased array antenna device using a phase shifter utilizing a change in a dielectric constant depending on the alignment state of a liquid crystal is disclosed (For example, refer to Japanese Unexamined Patent Application Publication No. JPH11-103201).

The introduction of the fifth-generation communication standard called 5G is proceeding in the communication field. This communication standard adopts the frequency of a millimeter wave band from 26 GHz to 28 GHz. The use of millimeter-wave frequencies in 5G standard communications can achieve very high throughput and enable transmission over a wide bandwidth. Radio waves with millimeter-wave frequencies have a high straight-line properties and are difficult to propagate around obstacles. Therefore, in urban areas, the communication area covered by the 5G standard becomes narrow.

A reflector is used to extend the communication area to avoid obstacles. When a metal reflecting plate is used as a reflector, the cross-sectional area for a straight traveling radio wave decreases when the reflection angle is increased. To dynamically control the reflection direction of radio waves by a metal reflector, a mechanical element must be included, and the equipment becomes large and expensive.

SUMMARY

A reflect array in an embodiment according to the present invention includes a patch electrode, a ground electrode arranged opposite the patch electrode and spaced apart from the patch electrode, a liquid crystal layer between the patch electrode and the ground electrode, and a dielectric substrate on an opposite side of the patch electrode from the liquid crystal layer. A thickness T from a surface on the liquid crystal layer side of the patch electrode to a surface on the opposite side of the dielectric substrate from the patch electrode has a thickness equivalent to a quarter of a wavelength of a radio wave irradiated to the patch electrode.

DESCRIPTION OF EMBODIMENTS

Hereinafter, embodiments of the present invention are described with reference to the drawings. However, the present invention can be implemented in many different aspects, and should not be construed as being limited to the description of the following embodiments. For the sake of clarifying the explanation, the drawings may be expressed schematically with respect to the width, thickness, shape, and the like of each part compared to the actual aspect, but this is only an example and does not limit the interpretation of the present invention. For this specification and each drawing, elements similar to those described previously with respect to previous drawings may be given the same reference sign (or a number followed by a, b, etc.) and a detailed description may be omitted as appropriate. The terms "first" and "second" appended to each element are a convenience sign used to distinguish them and have no further meaning except as otherwise explained.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

1. Reflector Unit Cell

Figure 1A:
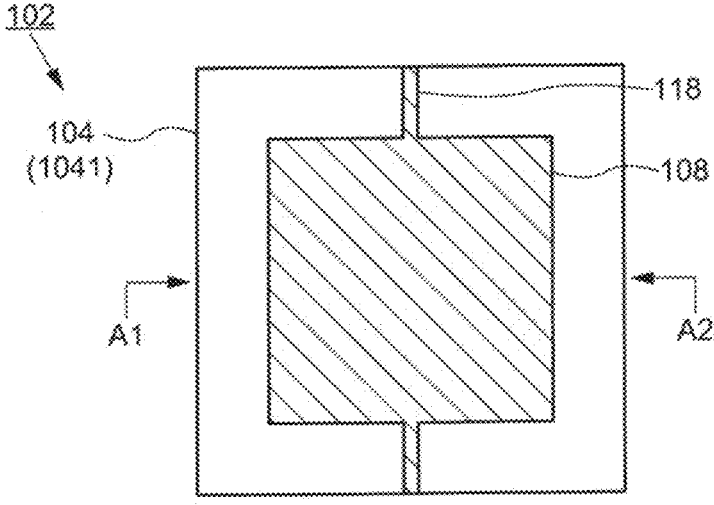
FIG. 1A is a plan view of a reflector unit cell utilized in a reflect array according to an embodiment of the present invention.
Figure 1B:
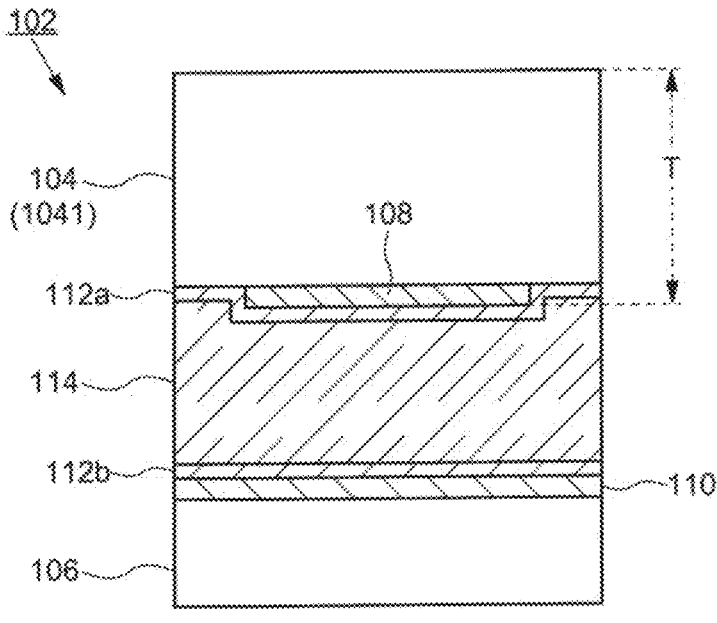
FIG. 1B is a plan view of a reflector unit cell utilized in a reflect array according to an embodiment of the present invention, and shows a cross-sectional structure between A1-A2 shown in FIG. 1A.

FIG. 1A and FIG. 1B show a reflector unit cell 102 used in a reflect array according to an embodiment of the present invention. FIG. 1A shows a plan view of the reflector unit cell 102 viewed from above (a side where radio waves enter), and FIG. 1B shows a cross-sectional view between A1-A2 shown in a plan view.

As shown in FIG. 1A and FIG. 1B, the reflector unit cell 102 includes a dielectric substrate 104, a counter substrate 106, a patch electrode 108, a ground electrode 110, a liquid crystal layer 114, a first alignment film 112a, and a second alignment film 112b. The dielectric substrate 104 can be regarded as a dielectric layer as it forms one layer in the reflector unit cell 102. The patch electrode 108 is disposed on the dielectric substrate (dielectric layer) 104, and the ground electrode 110 is disposed on the counter substrate 106. The first alignment film 112a is disposed on the dielectric substrate (dielectric layer) 104 to cover the patch electrode 108, and the second alignment film 112b is disposed on the counter substrate 106 to cover the ground electrode 110. The patch electrode 108 and the ground electrode 110 are arranged to face each other, and a liquid crystal layer 114 is disposed between the patch electrode 108 and the ground electrode 110. The first alignment film 112a is interposed between the patch electrode 108 and the liquid crystal layer 114, and the second alignment film 112b is interposed between the ground electrode 110 and the liquid crystal layer 114.

The patch electrode 108 is preferably symmetrical with respect to the vertical and horizontal polarization of the incoming radio wave, and has a square or circular shape in a plan view. FIG. 1A shows the case where the patch electrode 108 has a square shape when seen in a plan view. There is no particular limitation to the shape of the ground electrode 11 and it may have a shape in which almost the entire surface of the counter substrate 106 widens to have an area wider than the patch electrode 108. There is no limitation on materials used to form the patch electrode 108 and the ground electrode 110, which may be formed using conductive metals and metal oxides. The dielectric substrate (dielectric layer) 104 may be disposed with a first wiring 118. The first wiring 118 is connected to the patch electrode 108. The first wiring 118 can be used to apply a control signal to the patch electrode 108. The first wiring 118 can also be used to connect one patch electrode to an adjacent patch electrode when a plurality of reflector unit cells are arranged.

Although not shown in FIG. 1A and FIG. 1B, the dielectric substrate (dielectric layer) 104 and the counter substrate 106 are bonded together by a sealant. The dielectric substrate (dielectric layer) 104 and the counter substrate 106 are arranged opposite each other with a gap, and the liquid crystal layer 114 is disposed within a region surrounded by the sealant. The liquid crystal layer 114 is disposed to fill the gap between the dielectric substrate (dielectric layer) 104 and the counter substrate 106. A distance between the dielectric substrate (dielectric layer) 104 and the counter substrate 106 is 20 to 100 μm, for example, a distance of 50 μm. Since the patch electrode 108, the ground electrode 110, the first alignment film 112a, and the second alignment film 112b are disposed between the dielectric substrate (dielectric layer) 104 and the counter substrate 106, the distance between the first alignment film 112a and the second alignment film 112b disposed on each of the dielectric substrate 104 and the counter substrate 106 is precisely the thickness of the liquid crystal layer 114. Although not shown in FIG. 1B, a spacer may be disposed between the dielectric substrate (dielectric layer) 104 and the counter substrate 106 to keep the distance constant.

A control signal is applied to the patch electrode 108 to align liquid crystal molecules in the liquid crystal layer 114. The control signal is a DC voltage signal or a polarity inversion signal in which positive and negative DC voltages are alternately inverted. The ground electrode 110 is applied a voltage at a level intermediate between ground or the polarity inversion signal. When the control signal is applied to the patch electrode 108, the alignment state of the liquid crystal molecules contained in the liquid crystal layer 114 is changed. Liquid crystal materials having dielectric anisotropy are used for the liquid crystal layer 114. For example, nematic, smectic, cholesteric, and discotic liquid crystals are used as the liquid crystal layer 114. The liquid crystal layer 114 with dielectric anisotropy has a dielectric constant that changes due to changes in the alignment state of the liquid crystal molecules. The reflector unit cell 102 can change the dielectric constant of the liquid crystal layer 114 by the control signal applied to the patch electrode 108, thereby delaying the phase of the reflected wave when it reflects radio waves.

The frequency bands of radio waves reflected by the reflector unit cell 102 are the very short wave (VHF) band, ultra short wave (UHF) band, microwave (SHF) band, submillimeter wave (THF), and millimeter wave (EHF) band. The liquid crystal molecules in the liquid crystal layer 114 align themselves in response to the control signal applied to the patch electrode 108, but they hardly follow the frequency of the radio waves irradiated to the patch electrode 108. Therefore, the reflector unit cell 102 can control the phase of the reflected radio waves without being affected by radio waves.

Figure 2A:
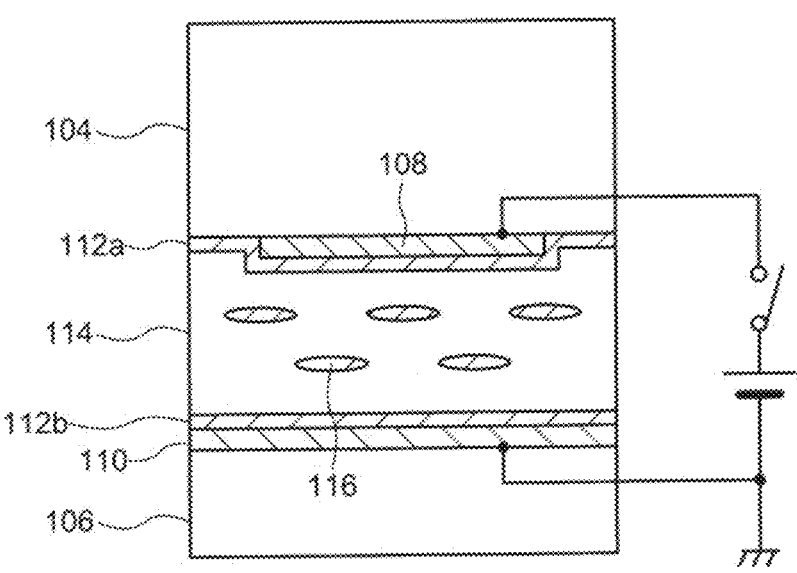
FIG. 2A is a diagram showing a state in which a voltage is not applied between a patch electrode and a ground electrode in a reflector unit cell utilized in a reflect array according to an embodiment of the present invention.
Figure 2B:
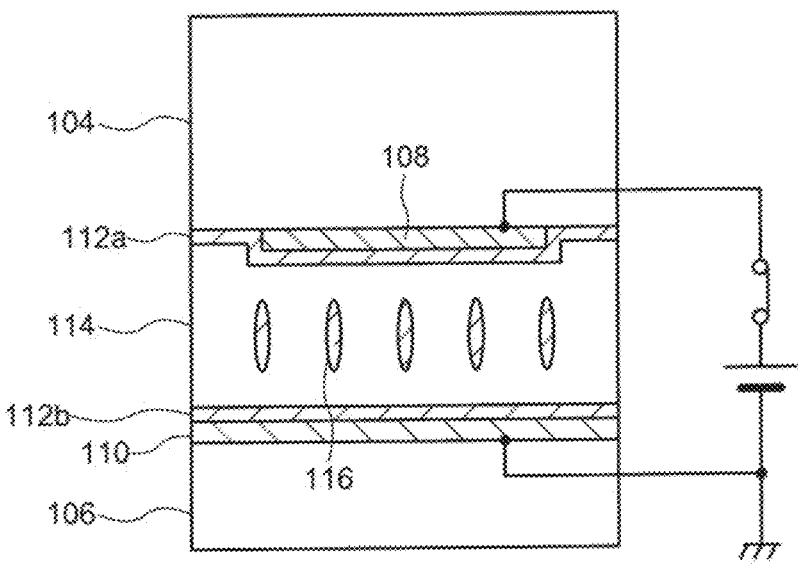
FIG. 2B is a diagram showing a state in which a voltage is applied between a patch electrode and a ground electrode in a reflector unit cell used in a reflect array according to an embodiment of the present invention.

FIG. 2A shows a state ("first state") in which voltage is not applied between the patch electrode 108 and the ground electrode 110. FIG. 2A shows an example where the first alignment film 112a and the second alignment film 112b are horizontally aligned films. The long axis of the liquid crystal molecules 116 in the first state is aligned horizontally with respect to the surfaces of the patch electrode 108 and the ground electrode 110 by the first alignment film 112a and the second alignment film 112b. FIG. 2B shows a state ("second state") in which a control signal (voltage signal) is applied to the patch electrode 108. The liquid crystal molecules 116 are aligned in the second state with the long axis perpendicular to the surfaces of the patch electrode 108 and the ground electrode 110 under the effect of the electric field. According to the magnitude of the control signal applied to the patch electrode 108 (magnitude of the voltage between the counter electrode and the patch electrode), it is possible to align the angle at which the long axis of the liquid crystal molecules 116 is aligned in an intermediate direction between the horizontal and vertical directions.

When the liquid crystal molecules 116 have positive dielectric anisotropy, the dielectric constant is larger in the second state relative to the first state. When the liquid crystal molecules 116 have negative dielectric anisotropy, the dielectric constant is smaller in the second state relative to the first state. The liquid crystal layer 114 having dielectric anisotropy can be regarded as a variable dielectric layer. The reflector unit cell 102 can be controlled to delay (or not) the phase of the reflected wave by using the dielectric anisotropy of the liquid crystal layer 114.

The reflector unit cell 102 is used for a reflector that reflects radio waves in a specified direction. The reflector unit cell 102 is preferred to have as little attenuation of the amplitude of the reflected radio waves as possible. As is clear from the structure shown in FIG. 1B, when radio waves propagating in the air are reflected by the reflector unit cell 102, the radio waves pass through the dielectric substrate (dielectric layer) 104 twice. The dielectric substrate (dielectric layer) 104 is formed of a dielectric material such as, for example, glass or resin. Since the phase velocity of radio waves changes as they pass through the dielectric, it is necessary to consider the thickness of the dielectric substrate (dielectric layer) 104 to ensure that the amplitude of the reflected wave is not attenuated.

Figure 3:
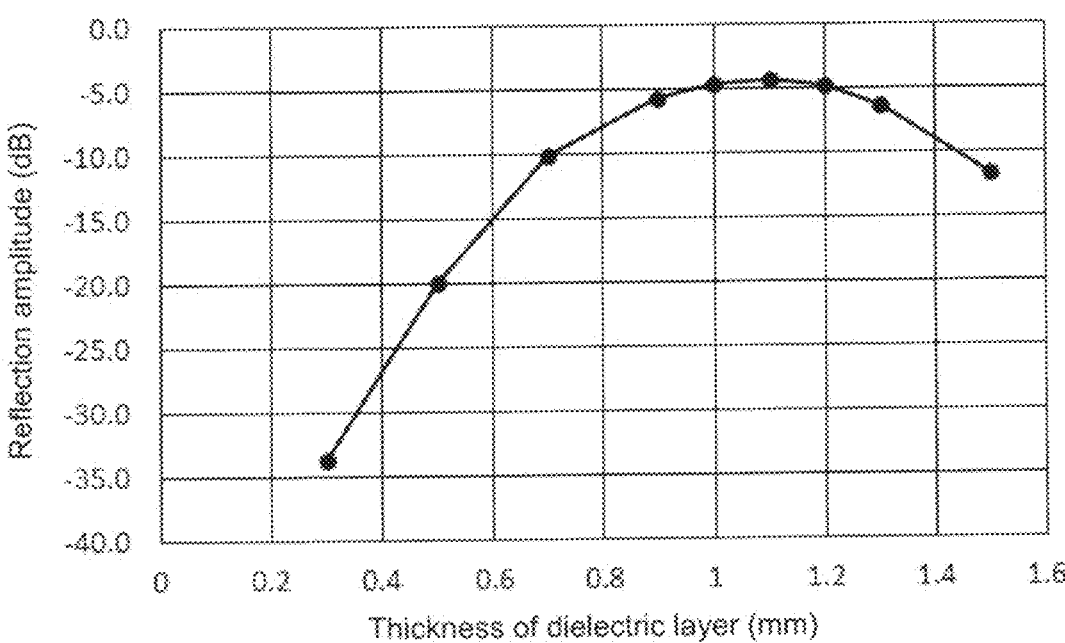
FIG. 3 is a simulation result of a relationship between the thickness of a dielectric substrate (dielectric layer) and an amplitude of a reflected wave in a reflect array according to an embodiment of the present invention.

FIG. 3 shows the results of a simulation of the relationship between the thickness of the dielectric substrate (dielectric layer) 104 (that is, the thickness of the dielectric layer) and the amplitude of the reflected wave. The simulation shown in FIG. 3 is based on an array of a plurality of reflector unit cells 102, and assumes a reflector in a reflect array. The size of the patch electrode 108 in the reflector unit cell 102 is 2.85 mm×2.85 mm, and a condition is set so that the patch electrodes 108 of this size are arranged at a pitch of 3.5 mm. The thickness of the liquid crystal layer 114 of the reflector unit cell 102 is 50 μm, and the thickness of the dielectric substrate (dielectric layer) 104 is used as a parameter in the calculation. The frequency of the radio wave is 28 GHZ. The simulation was performed by GST Studio Suite (Dassault Systèmes, Inc.).

FIG. 3 shows the results of a simulation of the relationship between the thickness of the dielectric substrate (dielectric layer) 104 and the amplitude of the reflected wave. Table 1 shows the numerical data obtained from the same simulation. From the graph shown in FIG. 3 and Table 1, it can be seen that the amplitude of the reflected wave varies depending on the thickness of the dielectric substrate (dielectric layer) 104. Specifically, when the thickness of the dielectric substrate (dielectric layer) 104 is 1.1 mm, the amplitude of the reflected wave is −4.3 dB, which is the maximum result obtained within the range of this simulation. It is confirmed that the amplitude of the reflected wave is within a good range, roughly −2 dB, even within a range of ±0.2 mm centered on the thickness of the dielectric substrate (dielectric layer) 104 of 1.1 mm.

TABLE 1

| Thickness of dielectric layer (mm) | Amplitude of reflected wave (dB) |
|---|---|
| 0.3 | −33.7 |
| 0.5 | −19.9 |
| 0.7 | −10.0 |
| 0.9 | −5.7 |
| 1.0 | −4.6 |
| 1.1 | −4.3 |
| 1.2 | −4.8 |
| 1.3 | −6.4 |
| 1.5 | −11.7 |

According to the data shown in FIG. 3 and Table 1, when the wavelength of radio waves is λ, a thickness of the dielectric substrate (dielectric layer) 104 equivalent to λ/4 (quarter-wavelength) is preferred. That is, when the thickness of the dielectric substrate (dielectric layer) 104 is T and the wavelength of the radio wave is A in FIG. 1B, the amplitude of the reflected wave can be increased when the relationship satisfies the following equation (1).

$$T = \frac{1}{4}\lambda \pm 0.2 \text{ mm} \tag{1}$$

Wherein, λ/4=(c/f/ε$^{0.5}$)/4, wherein c is the speed of light, f is the frequency of radio waves, and & is the relative permittivity of the dielectric substrate (dielectric layer) 104. The thickness T can be the length from the surface of the liquid crystal layer 114 side of the patch electrode 108 to the surface of the dielectric substrate (dielectric layer) 104 opposite the surface on which the patch electrode 108 is disposed.

Figure 4A:
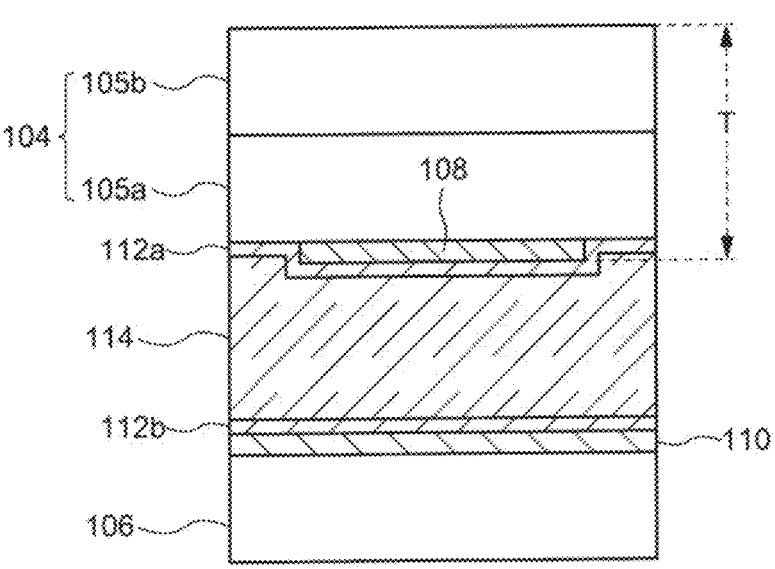
FIG. 4A is a cross-sectional structure of a reflector unit cell utilized in a reflect array according to an embodiment of the present invention.

The thickness T of the dielectric substrate (dielectric layer) 104 shown in equation (1) is an effective thickness for radio waves incident on the reflector unit cell 102. The dielectric substrate (dielectric layer) 104 need not be a single dielectric substrate (or a single layer), and may be formed from a plurality of dielectric substrates or a plurality of dielectric layers. For example, FIG. 4A shows an example where the dielectric substrate (dielectric layer) 104 is formed from a plurality of substrates (first substrate 105a, second substrate 105b). The first substrate 105a and the second substrate 105b in FIG. 4a may be glass substrates of the same or different glass materials, or one may be a glass substrate and the other a resin film substrate. In the example shown in FIG. 4A, there is no limitation on the number of the dielectric substrates (dielectric layers) 104, and there is no limitation on the number of substrates as long as the relationship shown in equation (1) is satisfied.

Figure 4B:
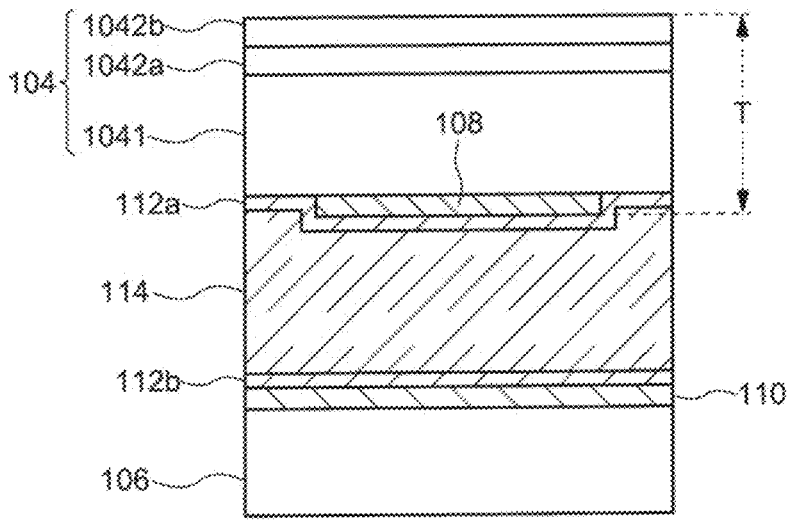
FIG. 4B is a cross-sectional structure of a reflector unit cell utilized in a reflect array according to an embodiment of the present invention.

FIG. 4B shows an example in which the dielectric substrate (dielectric layer) 104 includes a plurality of dielectric materials. Specifically, an example is shown in which the dielectric substrate (dielectric layer) 104 is formed of a first glass substrate 1041, a first resin film 1042a, and a second resin film 1042b. In the example shown in FIG. 4B, there is no limitation on the number of resin films to be laminated to the first glass substrate 1041, as long as the thickness T shown in formula (1) is satisfied. Thus, it is possible to adjust the thickness T to match the wavelength of radio waves reflected by the patch electrode 108 by laminating a plurality of resin films.

According to this embodiment, the dielectric substrate (dielectric layer) 104 located on the upper surface of the patch electrode 108 has a thickness equivalent to ¼ wavelength of the wavelength of the reflected radio wave, thereby increasing the amplitude of the reflected wave. The dielectric substrate (dielectric layer) 104 is not limited to a single substrate (or a single layer), and can have a plurality of stacked dielectrics so that the thickness of the dielectric substrate (dielectric layer) 104 can be adjusted accordingly.

2. Reflect Array

Next, the structure of the reflection array in which the reflector units are integrated is shown.

2-1. Reflect Array A (Uniaxial Reflection Control)

Figure 5:
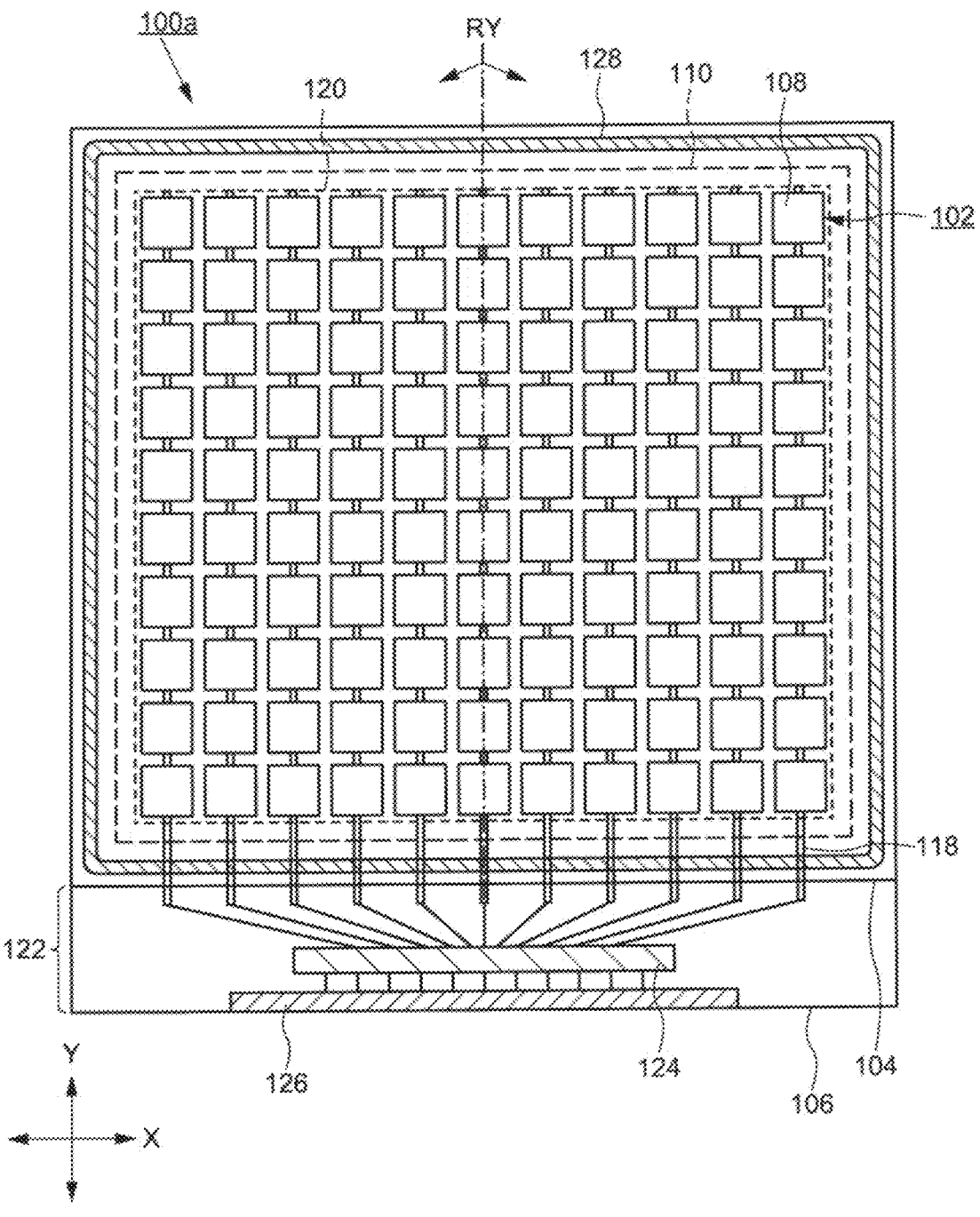
FIG. 5 is a diagram showing a structure of a reflect array according to an embodiment of the present invention.

FIG. 5 shows a configuration of a reflect array 100a according to an embodiment of the present invention. The reflect array 100a includes a reflector 120. The reflector 120 is configured with a plurality of reflector unit cells 102. The plurality of reflector unit cells 102 are arranged, for example, in a first direction (X-axis direction shown in FIG. 5) and in a second direction (Y-axis direction shown in FIG. 5) that intersects the first direction. The plurality of reflector unit cells 102 are arranged so that the patch electrodes 108 face the plane of incidence of radio waves. The reflector 120 is flat, and the plurality of patch electrodes 108 are arranged in this flat plane in a matrix.

The reflect array 100 has a structure in which the plurality of reflector unit cells 102 are integrated on a single dielectric substrate (dielectric layer) 104. As shown in FIG. 5, the reflect array 100 has a structure in which a dielectric substrate (dielectric layer) 104 with an array of the plurality of patch electrodes 108 and the counter substrate 106 with the ground electrode 110 are arranged on top of each other, and the liquid crystal layer (not shown) is disposed between the two substrates. The reflector 120 is formed in the region where the plurality of patch electrodes 108 and the ground electrode 110 are superimposed. A cross-sectional structure of the reflector 120 is the same as that of the reflector unit cell 102 shown in FIG. 1B when viewed with respect to the individual patch electrodes 108. The dielectric substrate (dielectric layer) 104 and the counter substrate 106 are bonded to each other by a sealant 128, and the liquid crystal layer, not shown, is disposed in the region inside the sealant 128.

The dielectric substrate (dielectric layer) 104 has a thickness equivalent to ¼ wavelength of the wavelength of the reflected radio wave. The dielectric substrate (dielectric layer) 104 has a region facing the counter substrate 106 and a peripheral region 122 extending outward from the counter substrate 106. The peripheral region 122 is disposed with a first driver circuit 124 and a terminal part 126. The first driver circuit 124 outputs control signals to the patch electrode 108. The terminal part 126 is a region that forms a connection with an external circuit, for example, a flexible printed circuit board, not shown, is connected to the terminal part 126. Signals controlling the first driver circuit 124 are input to the terminal part 126.

As described above, the plurality of patch electrodes 108 is arranged on the dielectric substrate (dielectric layer) 104 in the first (X-axis) and the second (Y-axis) directions. A plurality of first wirings 118 extending in the second direction (Y-axis direction) are arranged on the dielectric substrate (dielectric layer) 104. Each of the plurality of first wirings 118 is electrically connected to the plurality of patch electrodes 108 arranged in the second direction (Y-axis direction). In other words, the plurality of patch electrodes 108 arranged in the second direction (Y-axis direction) are connected by the first wiring 118. The reflector 120 has a configuration of a plurality of patch electrode arrays in a single row connected by the first wiring 118 in the first direction (X-axis direction).

The plurality of first wirings arranged on the reflector 120 extend to the peripheral region 122 and are connected to the first driver circuit 124. The first driver circuit 124 outputs control signals to be applied to the patch electrode 108. The first driver circuit 124 can output control signals of different voltage levels to each of the plurality of first wirings 118. As a result, the control signal is applied to the plurality of patch electrodes 108 arranged in the first (X-axis) and second (Y-axis) directions in the reflector 120, row by row (for each patch electrode 108 arranged in the second direction (Y-axis)).

A control signal is applied to each pair of the plurality of patch electrodes 108 arranged in the second direction (Y-axis direction) in the reflect array 100a. Thereby, the direction of reflection of the reflected wave of a radio wave incident on the reflector 120 can be controlled. That is, the reflect array 100a can control the direction of travel of the reflected wave in the left and right directions on the drawing with respect to the reflection axis VR, which is parallel to the second direction (Y-axis direction), of the radio wave irradiated on the reflector 120.

Figure 6:
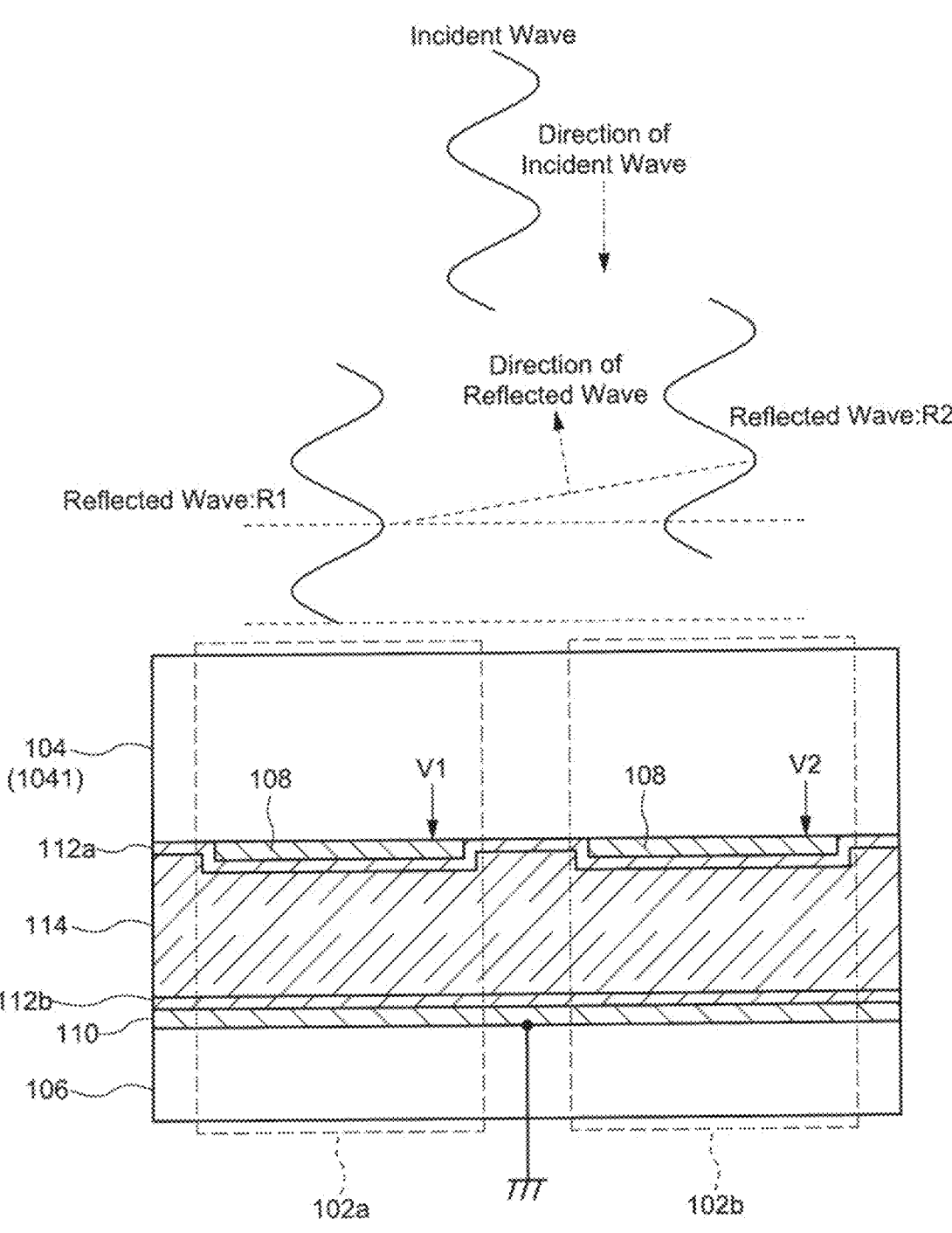
FIG. 6 is a schematic diagram showing a change in the traveling direction of a reflected wave by a reflect array according to an embodiment of the present invention.

FIG. 6 schematically shows that the direction of travel of the reflected wave is changed by the two reflector unit cells 102. In the case where radio waves are incident on the first reflector unit cell 102a and the second reflector unit cell 102b at the same phase, since different control signals (V1≠V2) are applied to the first reflector unit cell 102a and the second reflector unit cell 102b, the phase change of the reflected wave by the second reflector unit cell 102b is larger than that of the first reflector unit cell 102a. As a result, the phase of the reflected wave R1 reflected by the first reflector unit cell 102a and the phase of the reflected wave R2 reflected by the second reflector unit cell 102b differ (in FIG. 6, the phase of the reflected wave R2 is more advanced than that of the reflected wave R1), and the apparent traveling direction of the reflected wave changes obliquely.

In FIG. 5, since the plurality of patch electrodes 108 arranged in the second direction (Y-axis direction) are electrically connected by the first wiring 118 and are electrically equipotential, it is also possible to replace it with a strip electrode continuous in the second direction (Y-axis direction) instead of a plurality of divided shapes. However, since the dimensions of the patch electrode 108 have an appropriate range depending on the wavelength of the reflected radio wave, if it is made into a strip electrode, the sensitivity is reduced for the target wavelength and the behavior for the vertical polarization wave and horizontal polarization wave is different. Therefore, as shown in FIG. 5, it is preferable to arrange the patch electrodes 108 in an array as a shape that is symmetrical for a vertical polarization wave and a horizontal polarization wave (FIG. 5 shows a square, but it may be circular) and to connect the plurality of patch electrodes 108 that are arranged parallel to the reflection axis RY by the first wiring 118.

Although not shown in FIG. 5, the thickness of the dielectric substrate (dielectric layer) 104 of the reflect array 100a has a thickness equivalent to ¼ wavelength of the target radio wave. In this way, it is possible to ensure that the reflect array 100a does not attenuate the amplitude of the reflected waves.

2-2. Reflect Array B (Biaxial Reflection Control)

Since the reflect array 100a has a single reflection axis RY, the reflection angle can be controlled in the direction with the reflection axis RY as the axis of rotation. In contrast, this embodiment shows an example of a reflect array 100b that is capable of biaxial reflection control. In the following description, the focus will be on the parts that differ from the reflect array 100a.

Figure 7:
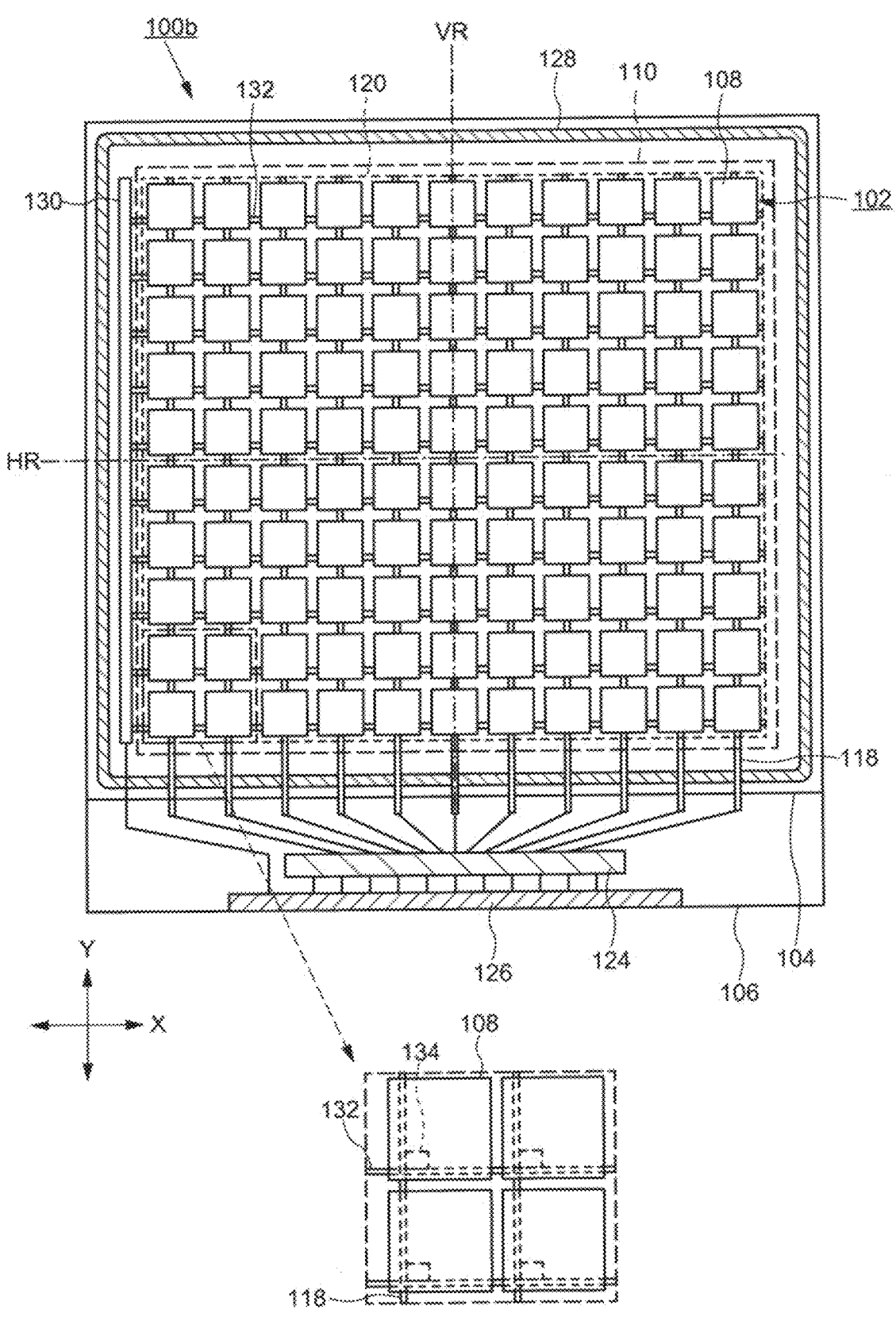
FIG. 7 is a diagram showing a structure of a reflect array according to an embodiment of the present invention.

FIG. 7 shows the configuration of the reflect array 100b. The following description will focus on the differences from the reflect array 100a shown in FIG. 5.

The reflect array 100b has a plurality of second wirings 132 extending in the first direction (X-axis direction) in addition to a plurality of first wirings 118 extending in the second direction (Y-axis direction) in the reflector 120. The plurality of first wirings 118 and the plurality of second wirings 132 are arranged to intersect across an insulating layer not shown in the diagram. The plurality of first wirings 118 are connected to a first driver circuit 124, and the plurality of second wirings 132 are connected to a second driver circuit 130. The first driver circuit 124 outputs control signals and the second driver circuit 130 outputs scanning signals.

FIG. 7 shows an enlarged inset of the arrangement of the four patch electrodes 108, the first wirings 118 and the second wirings 132. Each of the four patch electrodes 108 is disposed with a switching element 134. Switching (on and off) of the switching element 134 is controlled by the scanning signal applied to the second wiring 132. A control signal is applied from the first wiring 118 to the patch electrode 108 where the switching element 134 is turned on. The switching element 134 is formed, for example, by a thin-film transistor. According to this configuration, the plurality of patch electrodes 108 arranged in the first direction (X-axis direction) can be selected row by row, and control signals of different voltage levels can be applied to each row.

The reflect array 100b shown in FIG. 7 can control the direction of travel of the reflected wave in the left and right directions on the drawing, centered on the reflection axis VR parallel to the second direction (Y-axis direction), when the radio wave is irradiated on the reflector 120, furthermore, the direction of travel of the reflected wave can also be controlled in the vertical direction on the drawing, centered on the reflection axis HR parallel to the first direction (X-axis direction). That is, since the reflect array 100*b* has the reflection axis VR parallel to the second direction (Y-axis direction) and the reflection axis VH parallel to the first direction (X-axis direction), the reflection angle can be controlled in the direction with the reflection axis VR as the axis of rotation and in the direction with the reflection axis HR as the axis of rotation.

Figure 8:
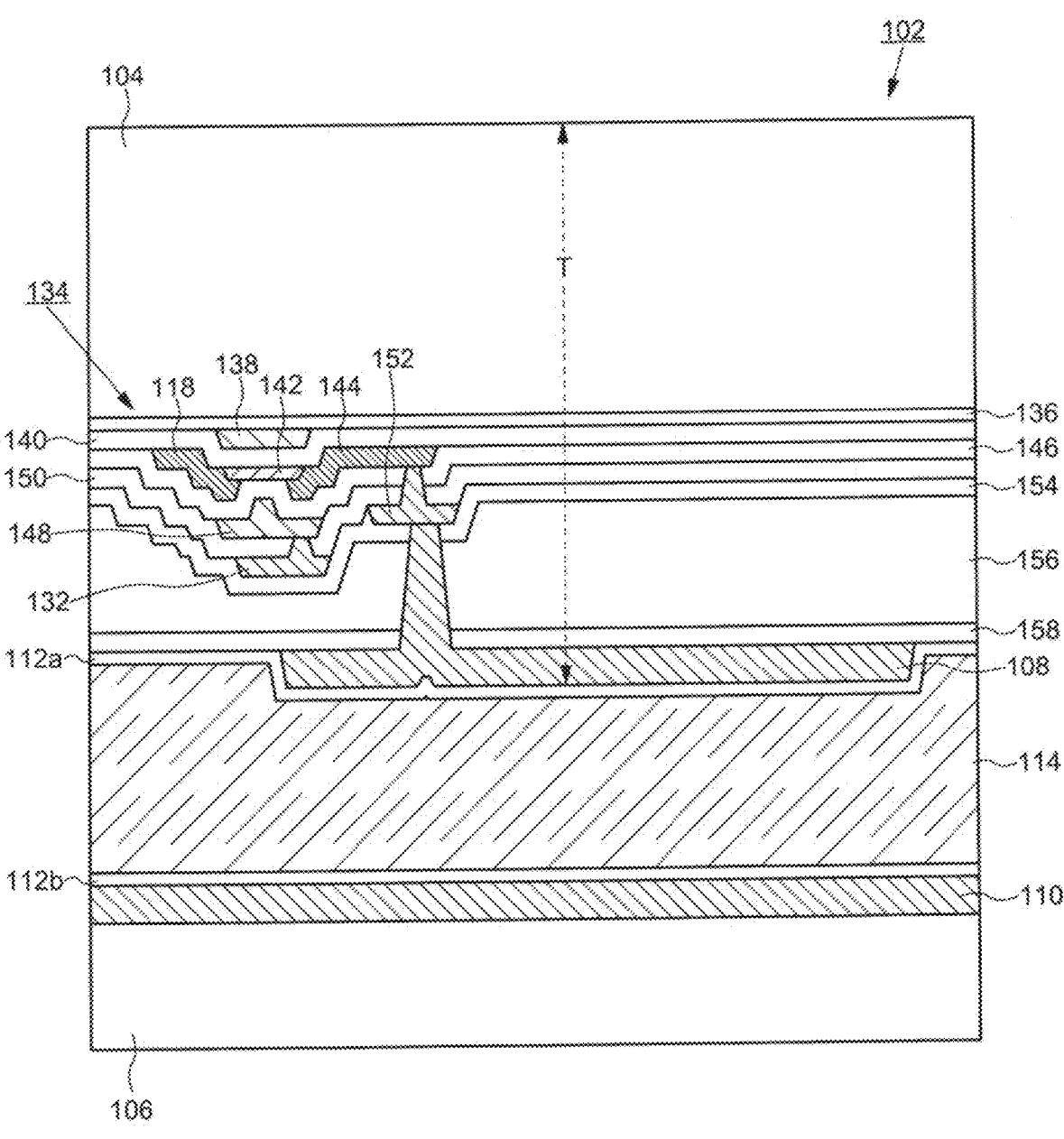
FIG. 8 is a cross-sectional structure of a reflector unit cell in a reflect array according to an embodiment of the present invention.

FIG. 8 shows an example of the cross-sectional structure of the reflector unit cell 102 with the switching element 134 connected to the patch electrode 108. The switching element 134 is disposed on the dielectric substrate (dielectric layer) 104. The switching element 134 is a transistor and has a stacked structure of a first gate electrode 138, a second gate insulation layer 146, a semiconductor layer 142, a second gate insulation layer 146, and a second gate electrode 148. An undercoat layer 136 may be disposed between the first gate electrode 138 and the dielectric substrate (dielectric layer) 104. The first wiring 118 is disposed between the first gate insulating layer 140 and the second gate insulating layer 146. The first wiring 118 is disposed in contact with the semiconductor layer 142. A first connecting wiring 144 is disposed on the same layer as the conductive layer forming the first wiring 118. The first connecting wiring 144 is disposed in contact with the semiconductor layer 142. The connection structure of the first wiring 118 and the first connecting wiring 144 to the semiconductor layer 142 shows a structure in which one wiring is connected to the source of the transistor and the other wiring is connected to the drain.

A first interlayer insulating layer 150 is disposed to cover the switching element 134. The second wiring 132 is disposed on the first interlayer insulating layer 150. The second wiring 132 is connected to the second gate electrode 148 through a contact hole formed in the first interlayer insulation layer 150. Although not shown in the figure, the first gate electrode 138 and the second gate electrode 148 are electrically connected to each other in a region that does not overlap the semiconductor layer 142. A second connecting wiring 152 is disposed on the first interlayer insulating layer 150 with the same conductive layer as the second wiring 132. The second connecting wiring 152 is connected to the first connecting wiring 144 through a contact hole formed in the first interlayer insulating layer 150.

A second interlayer insulating layer 154 is disposed to cover the second wiring 132 and the second connecting wiring 152. Furthermore, a planarization layer 156 is disposed to fill the steps of the switching element 134. It is possible to form the patch electrode 108 without being affected by the arrangement of the switching element 134 by arranging the planarization layer 156. A passivation layer 158 is disposed over the flat surface of the planarization layer 156. The patch electrode 108 is disposed over the passivation layer 158. The patch electrode 108 is connected to the second connecting wiring 152 through a contact hole formed through the passivation layer 158, the planarization layer 156, and the second interlayer dielectric layer 154. The first alignment film 112*a* is disposed over the patch electrode 108.

The counter substrate 106 includes the ground electrode 110 and the second alignment film 112*b* as shown in FIG. 1B. A surface of a dielectric substrate (dielectric layer) 104 on which the switching element 134 and the patch electrode 108 are disposed and a surface of a counter substrate on which the ground electrode 110 is disposed are arranged so as to face each other, and the liquid crystal layer 114 is disposed therebetween. The thickness T of the dielectric substrate (dielectric layer) 104 can be the length from the surface of the liquid crystal layer 114 side of the patch electrode 108 to the opposite side of the dielectric substrate (dielectric layer) 104 from which the patch electrode 108 is disposed. In this case, the thickness of at least one insulating layer (the undercoat layer 136, the first gate insulation layer 140, the second gate insulation layer 146, the first interlayer insulation layer 150, the second interlayer insulation layer 154, the planarization layer 156, the passivation layer 158) between the patch electrode 108 and the dielectric substrate (dielectric layer) 104 can be considered.

Each layer formed on the dielectric substrate (dielectric layer) 104 is formed using the following materials. The undercoat layer 136 is formed, for example, with a silicon oxide film. The first gate insulating layer 140 and the second gate insulating layer 146 are formed, for example, with a silicon oxide film or a laminated structure of a silicon oxide film and a silicon nitride film. The semiconductor layers are formed of silicon semiconductors such as amorphous silicon and polycrystalline silicon, and oxide semiconductors including metal oxides such as indium oxide, zinc oxide, and gallium oxide. The first gate electrode 138 and the second gate electrode 148 may be configured, for example, of molybdenum (Mo), tungsten (W), or alloys thereof. The first wiring 118, the second wiring 132, the first connecting wiring 144, and the second connecting wiring 152 are formed using metal materials such as titanium (Ti), aluminum (Al), and molybdenum (Mo). For example, it may be configured with a titanium (Ti)/aluminum (Al)/titanium (Ti) laminate structure or a molybdenum (Mo)/aluminum (Al)/molybdenum (Mo) laminate structure. The planarization layer 156 is formed of a resin material such as acrylic, polyimide, or the like. The passivation layer 158 is formed of, for example, a silicon nitride film. The patch electrode 108 and the ground electrode 110 are formed of a metal film such as aluminum (Al), copper (Cu), or a transparent conductive film such as indium tin oxide (ITO).

As shown in FIG. 8, it is possible to select a predetermined patch electrode from the plurality of patch electrodes 108 arranged in a matrix and apply a control signal to the patch electrode, by connecting the second wiring 132 to the gate of the transistor used as the switching element 134, the first wiring 118 to one of the source and drain of the transistor, and the patch electrode 108 to the other of the source and drain. Then, it is possible to apply a control voltage to each patch electrode 108 arranged in a row along the first direction (x-axis direction) or each patch electrode 108 arranged in a row along the second direction (y-axis direction), by arranging the switching element 134 for each individual patch electrode 108 in the reflector 120, for example, when the reflector 120 is upright, the direction of reflection of the reflected wave can be controlled in the left-right and vertical directions.

As described above, the reflect array 100 according to the present embodiment has the dielectric substrate (dielectric layer) 104 on the top surface of the plurality of patch electrodes 108 that form the reflector 120, the thickness of the dielectric substrate (dielectric layer) 104 has the thickness corresponding to ¼ wavelength of the wavelength of the radio wave incident on the reflector 120, thereby suppressing the attenuation of the amplitude of the reflected wave. These characteristics enable the attenuation of radio waves to be suppressed and communication devices to perform good communication even when multiple reflect arrays 100 are combined to form a transmission path in the air.

The patch electrode 108 and the ground electrode 110 of the reflect array 100 according to the present embodiment can be formed of a transparent conductive film. The liquid crystal layer 114 is also transparent. Therefore, the reflect array 100 can be used to eliminate radio dead zones (places where radio waves cannot reach) in urban areas by attaching the reflect array 100 to windows of high-rise construction buildings, to reflect radio waves in a predetermined direction.

The various configurations of the reflect array and reflector unit cells illustrated as embodiments of the present invention can be combined as appropriate as long as they do not contradict each other. Based on the reflect array and reflector unit cell disclosed in this specification and the drawings, any addition, deletion, or design change of configuration elements, or any addition, omission, or change of conditions of a process by a person skilled in the art as appropriate, are also included in the scope of the present invention as long as they have the gist of the invention.

It is understood that other advantageous effects different from the advantageous effects disposed by the embodiments disclosed herein, which are obvious from the description herein or which can be easily foreseen by a person skilled in the art, will naturally be disposed by the present invention.

What is claimed is:

1. A reflect array, comprising:
a patch electrode;
a ground electrode arranged opposite the patch electrode and spaced apart from the patch electrode;
a liquid crystal layer between the patch electrode and the ground electrode; and
a dielectric substrate on an opposite side of the patch electrode from the liquid crystal layer,
wherein a thickness T from a surface on the liquid crystal layer side of the patch electrode to a surface on the opposite side of the dielectric substrate from the patch electrode has a thickness equivalent to a quarter of a wavelength of a radio wave irradiated to the patch electrode.

2. The reflect array according to claim 1, wherein the thickness T of the dielectric substrate satisfies the following equation (1) when the wavelength of the radio wave irradiated to the patch electrode is λ, $$T = \frac{1}{4}\lambda \pm 0.2 \text{ mm} \tag{1}$$

wherein λ/4=(c/f/ε0.5)/4, c is the speed of light, f is a frequency of radio waves, and ε is a relative permittivity of the dielectric substrate.

3. The reflect array according to claim 1, wherein the dielectric substrate comprises a glass substrate.

4. The reflect array according to claim 3, wherein a radio frequency irradiated to the patch electrode is 28 GHZ, and the thickness of the glass substrate is 1.1±0.2 mm.

5. The reflect array according to claim 1, wherein the dielectric substrate includes a first glass substrate and a second glass substrate.

6. The reflect array according to claim 1, wherein the dielectric substrate contains a plurality of dielectric materials.

7. The reflect array according to claim 6, wherein the dielectric substrate includes a glass substrate and at least one layer of a resin film.

8. The reflect array according to claim 7, wherein the at least one layer of a resin film consists of a plurality of resin films.

9. The reflect array according to claim 1, wherein at least one insulating layer is included between the patch electrode and the dielectric substrate.

10. The reflect array according to claim 1, wherein the patch electrode comprises a plurality of patch electrodes, and the plurality of patch electrodes are arranged in one or two dimensions.

11. The reflect array according to claim 10, wherein a switching device is connected to each of the plurality of patch electrodes.

* * * * *